United States Patent [19]

Morishita et al.

[11] Patent Number: 5,419,240

[45] Date of Patent: May 30, 1995

[54] APPARATUS FOR PRODUCING A BRICK OF FRIED NOODLES

[75] Inventors: Kenkichi Morishita, Osaka; Tatsuo Yamaya; Toshinari Hirata, both of Shiga, all of Japan

[73] Assignee: Nissin Shohuhin Kabushiki Kaisha, Osaka, Japan

[21] Appl. No.: 927,477

[22] PCT Filed: Feb. 28, 1992

[86] PCT No.: PCT/JP92/00240

§ 371 Date: Nov. 9, 1992

§ 102(e) Date: Nov. 9, 1992

[87] PCT Pub. No.: WO92/15202

PCT Pub. Date: Sep. 17, 1992

[30] Foreign Application Priority Data

Mar. 1, 1991 [JP] Japan .................................. 3-032640

[51] Int. Cl.⁶ .............................................. A47J 37/12
[52] U.S. Cl. .................................. 99/404; 426/439; 426/557
[58] Field of Search .................. 426/557, 439; 99/404

[56] References Cited

U.S. PATENT DOCUMENTS

| | | | |
|---|---|---|---|
| 3,892,874 | 7/1975 | Ando | 426/557 |
| 3,997,676 | 12/1976 | Ando | 426/557 |
| 4,166,139 | 8/1979 | Ishida | 426/557 |
| 4,185,125 | 1/1980 | Sakakibara et al. | 426/557 |
| 4,234,612 | 11/1980 | Sakakibara et al. | 426/439 |
| 4,728,520 | 3/1988 | Yamaya et al. | 426/557 |
| 4,828,859 | 5/1989 | Imai | 426/439 |
| 4,988,528 | 1/1991 | Tomoda | 426/557 |
| 5,182,982 | 2/1993 | Hattori et al. | 99/404 |

FOREIGN PATENT DOCUMENTS

| | | |
|---|---|---|
| 57-43224 | 9/1982 | Japan . |
| 60-196160 | 10/1985 | Japan . |
| 1-56771 | 12/1989 | Japan . |
| 4-30763 | 2/1992 | Japan . |

*Primary Examiner*—Donald E. Czaja
*Assistant Examiner*—Mary S. Mims
*Attorney, Agent, or Firm*—Marshall, O'Toole, Gerstein, Murray & Borun

[57] ABSTRACT

An apparatus for producing a brick of the fried noodles comprising a fry retainer having permeable small holes, a lid, and oil removal means for forcibly sucking and removing the oil and the fat contained in the brick of the fried noodles through the bottom of said fry retainer raised above the oil surface immediately after completing the frying.

5 Claims, 3 Drawing Sheets

7
Oil Removing Head

4
Brick of the Noodles

APPARATUS FOR PRODUCING A BRICK OF FRIED NOODLES

TECHNICAL FIELD

The present invention relates to a method for producing a brick of the fried noodles, and more particularly to a method for reducing an oil and a fat content at the time of packing the noodles obtained by an ordinary method in a fry retainer and frying it in oil.

BACKGROUND ART

Conventionally, there has been used a method for producing the fried noodles, being the mainstream of the quick-cookable noodles, comprising the steps of kneading the flour, the water, the kansui, and the other proper seasonings or the like to make a noodle dough, pressing, cutting and steaming the noodle dough, seasoning if necessary the noodle obtained, packing the noodles in a fry retainer for each fixed quantity, frying the packed noodles in the oil to dry, and cooling it (See, Japanese Patent Provisional Publication No. 48-8951). Since α treatment of the starch contained in the noodles are accelerated, when the noodles are fried, and the noodles are made porous, thereby the noodles having good taste and texture can easily be rehydrated in a short time by only pouring the hot water over the noodles.

In the meantime, the brick of the fried noodles contain generally an oil and a fat in a quantity of about 20%. In view of the various European and American type adult-diseases caused by the increase of the intake of the oil and the fat as the eating-habits are Europeanized, the consumers coming to tare care with the intake thereof recently, thereby the attention is beginning to be paid for the reduction of the oil and the fat content in the food. Since the content of the oil and the fat in these brick of the fried noodles is high, there were the problems of the oxidization thereof at the stage of the conveyance and the preservation and of the deterioration of the fried noodles due to the oxidization.

There has been employed, for example, a method for removing the oil by the centrifugation, by throwing it with the gravity (See, Japanese Utility Model Provisional Publication No. 62-202180) to reduce the oil and the fat content of the fried noodles.

In the methods aforementioned for reducing the oil and the fat content, satisfactory results can not be obtained therefrom.

For example, although the method for removing the oil by the centrifugation would remove the oil contained in a brick of the noodles, it is not suitable for the continuous manufacture because the fried noodles, not being appropriate for the product, is often produced by the damage caused at the time of the centrifugation, a device of the complicated structure and of the large-scaled may be required, each processing time comes to be long, and the batch-typed system have to be required.

Further, in the method for throwing the oil by the gravity disclosed in the Japanese Utility Model Provisional Publication No. 62-202180, since the oil is thrown only by the gravity during the sliding of the brick of the fried noodles above an oil throwing chute, there is a limit in the volume of the oil and fat to be removed from the brick of the noodles and this method is therefore not satisfactory with respect to the reduction of the residual oil and fat.

Under the circumstances, in the art, a method for effectively reducing an oil and the fat content, being capable of easily and efficiently removing the oil and applying to the continuous manufacture without damaging the brick of the fried noodles, is desired.

DISCLOSURE OF THE INVENTION

The present invention was invented in view of the prior art and the problems thereof aforementioned, and provides an invention of;

In a method for producing a brick of the fried noodles comprising the steps of cutting the noodles prepared by an ordinary method for each fixed quantity, packing the noodles in a fry retainer having the permeability, closing said fry retainer by a lid, and frying a brick of the noodles, characterized in that, sucking the oil, after completing the frying, contained in the brick of the noodles through the bottom of the fry retainer raised above an oil surface.

BEST MODES FOR CARRYING OUT THE INVENTION

Figure 1:
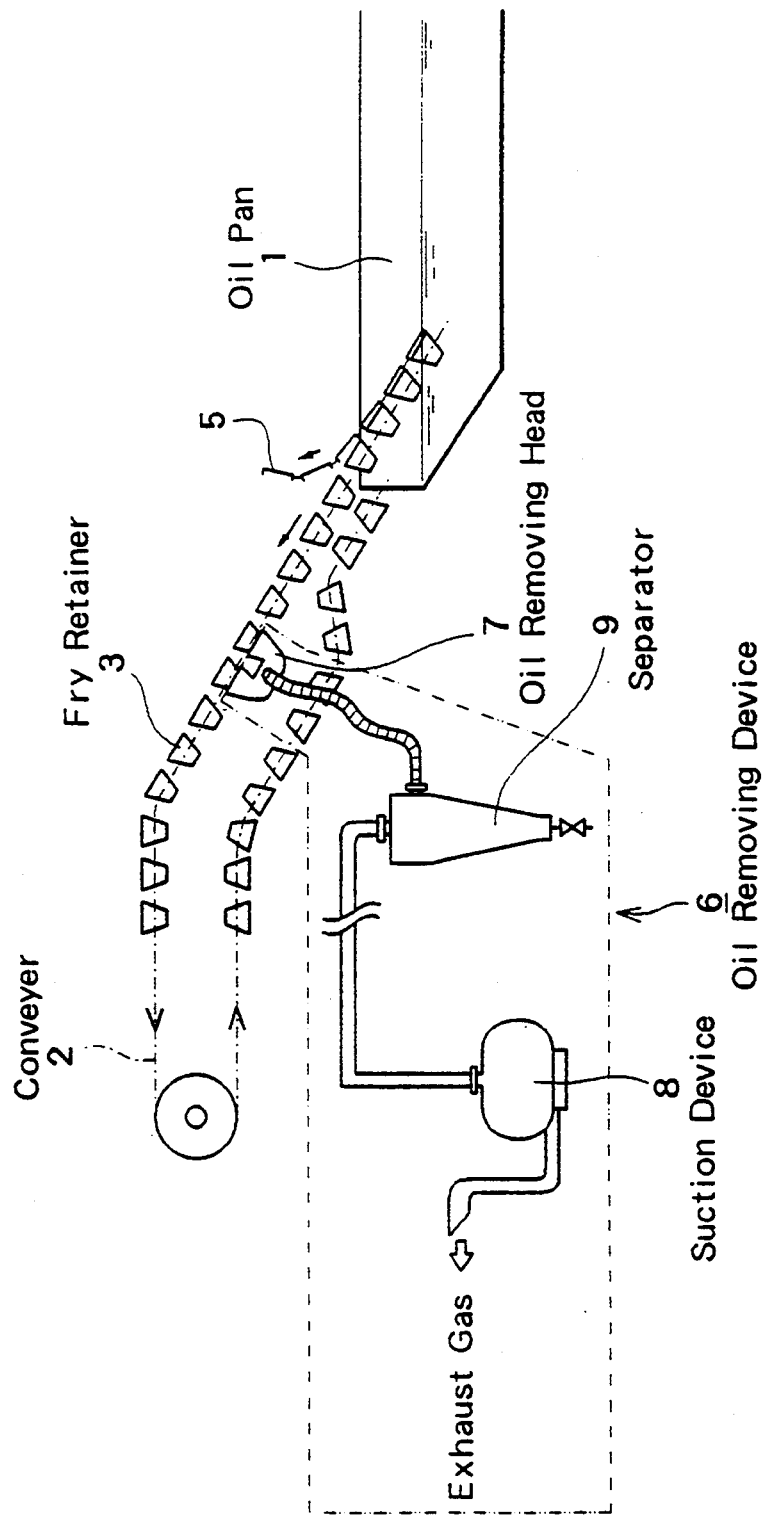
FIG. 1 is a schematic view showing a method for producing a brick of the fried noodles according to an embodiment of the present invention.

A method for producing a brick of the fried noodles of the present invention will be described in detail in the following by referring to the drawings.

FIG. 1 is a schematic view showing a method for producing a brick of the fried noodles according to an embodiment of the present invention and, in FIG. 1, the numeral 1 denotes a container (an oil pan) for frying wherein the heated oil is put therein. A plurality of the fry retainers 3 are carried by a conveyer 2 through the oil pan 1 and, at the time of passing through the oil, the noodles in the fry retainers 3 are fried. The noodles are prepared, in the a previous step (not shown), by cutting the noodles prepared by an ordinary method for each fixed quantity and packing the noodles in the fry retainer 3. The fry retainer 3 is shaped like a cup with a metal and have permeability by a plurality of small holes (not shown) on the bottom thereof, thereby the frying oil is able to enter the fry retainer 3 through the small holes to fry the noodles. A plurality of the upper lids 5 are provided above the fry retainers 3 and are carried by the another conveyer to open/close the fry retainers 3 at the appropriate positions, thereby the upper lid 5 is closed at a frying step to hold the noodles in the fry retainer 3.

After completing the frying step of the noodles, the fry retainer 3 is carried and raised from the oil pan 1 and is subjected to an oil removing treatment by means of an oil removing device 6 located in a predetermined position. More specifically, the oil removing heads 7,7 of the oil removing device 6 are connected from the downside of the fry retainer 3 to the bottom of the fry retainers 3 raised by the conveyer 2 (See, FIG. 3). By the suction force of a suction device 8, the oil contained in a brick of the fried noodles 4 is removed, simulataneously the sucked oil is passed through a separator (e.g. cyclone) 9 to collect and use it again.

Figure 2:
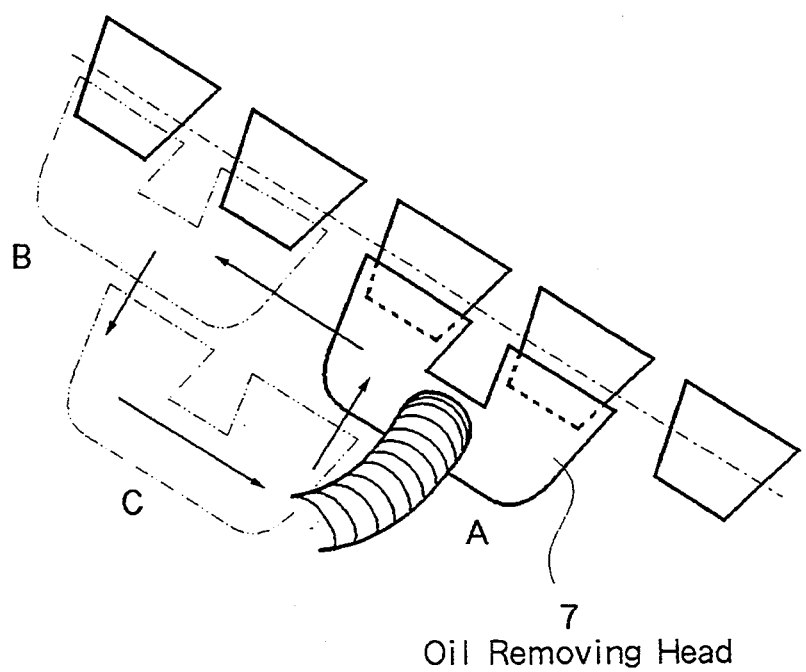
FIG. 2 is a schematic view showing the movement of a conveyer and an oil removing head of an oil removing device shown in FIG. 1.

The oil removing head 7 of the oil removing device 6 is driven by an appropriate drive mechanism (not shown) to follow the conveyer 2 moving continuously. Specifically, in a position A shown by a solid line in FIG. 2 (like an Example 2, to reach this position within 30 seconds, at longest 40 seconds, after frying is preferrable), the oil removing head 7 moves in the direction of the conveyer 2 to connect the head to the bottom of the fry retainer 3. In this state, the oil contained in the brick of the fried noodles 4 is removed by the suction force of the suction device 8 as mentioned above. Along with the movement of the conveyer 2, the oil removing head 7 is connected to the bottom of the fry retainer 3 (i.e., with sucking and removing the oil). Finally, at the time of reaching a position B shown by a dashed line in FIG. 2, the oil removing head 7 moves in the direction of separating from the conveyer 2, thereby the oil removing head 7 is detached from the bottom of the fry retainer 3 (as shown by a dashed line C in FIG. 2). The position B is determined according to the extent of the removed oil and the moving speed of the conveyer and, for example, to set to reach this position within 0.5 to 4 seconds after starting of the suction as mentioned in the Examples 1 and 2 is preferred. In this case, the number of the oil removing heads can be increased according to the time to be set. Finally, this cycle is repeated by returning to the position A shown by the solid line in FIG. 2.

According to the present embodiment, although the oil removing head 7 follows the continuous movement of the conveyer 2, the oil removing head 7 may perpendicularly reciprocate against the direction of the movement of the conveyer 2 and may have the structure for interlockingly and intermittently moving the conveyer 2 to correspond thereto. Further, the structure for removing the oil contained in the brick of the fried noodles 4, by closely or adjacently passing the fry retainer 3 above the top surface of the fixed oil removing head 7, may also be acceptable (See, FIG. 5(c)).

COMPARATIVE EXAMPLE 1

Distribution of Oil and Fat Contained in Brick of Fried Noodles and Experiment on Removal of Oil and Fat According to the Prior Art 105 g of the noodle, prepared by kneading 90 parts by weight of the flour, 10 parts by weight of the starch, 32 parts by weight of the water, 1.5 parts by weight of the salt and 0.2 part by weight of a powder of the kansui, pressing it to become a thickness of 0.75 mm, cutting with a square cutter No. 20 and seasoning by steaming for 2 minutes at 200 kg/hr (steam flow) with a liquid seasonings, are packed in a mold having a dimension of $\phi 82 \times \phi 65 \times$ height 57 mm and fried the packed noodles in an oil (palm oil) for 2 minutes and 10 seconds at a temperature of 147° to 150° C., thereby 65 g of a brick of the noodles to be put in a vertical cup is obtained.

Figure 4:
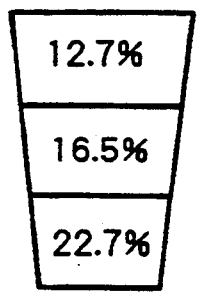
FIG. 4 is a view showing the oil and the fat content of a brick of the fried noodles held in a conventional vertical cup.

FIG. 4 shows an amounts of the oil contained in the upper, the middle and the lower layer portions of the brick of the noodles. As shown in FIG. 4, although the oil and the fat content of the lower layer portion is increased, the reason thereof would seems to be transferred the oil from the lower layer portion to the upper layer portion of the brick of the noodle at the time of frying, and to be gradually transferred, after frying, the oil of the surface of the noodle to the lower layer portion.

Figure 6:
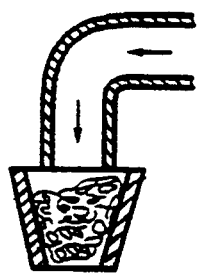
FIG. 6 is a schematic view for explaining a method for spraying high pressure air over the upper portion of a brick of the noodles to scatter the oil and the fat.

As shown in FIG. 6, although the high pressure air is sprayed over the upper portion of the brick of the noodle at an air flow of 6.7 $m^3$/min (for 1 second) to scatter the oil and the fat, a remarkable oil removing effects was not obtained due to the closed upper portion of the brick of the noodle and the poor ventilation (See, Column A in Table 1).

As shown in Table 1, the brick of the noodles once cooled (by a ventilation for 5 minutes at a room temperature) have no remarkable oil removing effects even if the brick of the noodle is heated and sucked again (by beating up to 150° C. with a hot air and sucking the oil and the fat at an air flow of 6.7 $m^3$/min) due to a penetration of the oil and the fat into the noodle (See, Column B in Table 1).

As a results of the experiments above, it had been proved that the oil and the fat would efficiently be removed by the suction through the bottom of the fry retainer in a short time after frying.

TABLE 1

| Result of Experiment on Removal of Oil and Fat | | | |
|---|---|---|---|
| | Oil and Fat Content (%) | | Oil and Fat Content (%) |
| Control | 17.3 | Control | 17.0 |
| A | 16.4 | B | 16.8 |

EXAMPLE 1

Relation Between Leaving Time/Sucking Time of a Brick of Fried Noodles and Volume of Removed Oil Each 105 g of the noodle, prepared by kneading the same materials of the Comparative Example according to the ordinary method, pressing it to become a thickness of 0.75 mm, cutting (a square cutter No. 20) and seasoning by steaming for 2 minutes at 200 kg/hr (steam flow) with a liquid seasonings, are packed in a mold (inner dimension of $\phi 82 \times \phi 65 \times$ height 57 mm) and fried the packed noodles in an oil (palm oil) for 2 minutes and 10 seconds at a temperature of 147° to 150° C., thereby 65 g of the brick of the noodle are produced.

Figure 3:
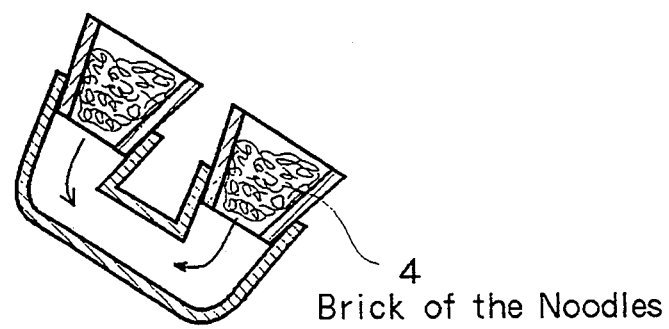
FIG. 3 is a section view of a fry retainer and the oil removing head shown in FIG. 2.

Selecting an appropriate condition of the sucking time of 0.5 to 4 seconds from the leaving time of the brick of the noodle of 15 to 60 seconds, and conducting, as shown in FIG. 3, the suction from the downside of the retainer, in the state of connecting (contacting) the oil removing head to the bottom of the retainer and closing the upper lid, with "Fuji Ring Blow ™" manufactured by Fuji Electric Co., Ltd. at an air flow of 6.7 $m^3$/min. The results of this experiment are shown in Table 2.

TABLE 2

Relation between Leaving Time/Sucing Time of a Brick of Fried Noodles and Volume of Removed Oil

|  |  |  | Time for Sucking Oil (second) | | | | |
|---|---|---|---|---|---|---|---|
|  |  |  | 0 | 0.5 | 1 | 2 | 4 |
| Time | 15 | Water (%) | 1.8 | 2.4 | 2.6 | 2.7 | 2.8 |
| for |  | Oil and Fat (%) | 17.0 | 12.7 | 12.6 | 12.5 | 11.9 |
| Leaving |  | Brick of Noodles | — | X | X | X | X |
| a | 30 | Water (%) | 1.8 | 2.5 | 2.6 | 2.6 | 2.5 |
| Brick |  | Oil and Fat (%) | 17.3 | 12.8 | 12.7 | 12.3 | 12.4 |
| of |  | Brick of Noodles | — | X | X | X | X |
| Fried | 60 | Water (%) | 1.7 | 2.3 | 2.5 | 2.6 | 2.4 |
| Noodles |  | Oil and Fat (%) | 17.0 | 13.4 | 13.2 | 12.8 | 13.0 |
| (Second) |  | Brick of Noodles | — | Y | Y | Y | Y |

X: No cracks occur onto a brick of fried noodles.
Y: Cracks occur onto a brick of fried noodles.

Apparently from Table 2, little change is observed on the volume of the removed oil according to the sucking time and there are no remarkable difference on the volume of the removed oil according to the leaving time. However, the brick of the fried noodle leaved for 60 seconds after completing the frying tends to slightly decrease the volume of the removed oil and to crack the brick of the noodle. As referred to above, this causes due to the penetration of the oil and the fat into the noodle as time passed and there is no crack by the suction force of the suction device at the time of suction because the brick of the noodle just fried have a high temperature and have a certain elasticity.

In contrast thereto, the temperature of the brick of the noodle is lowered, the elasticity of the noodle is eliminated, thereby the brick of the noodle comes to easily crack by the suction force of the suction device. On the other hand, although the water content of the brick of the noodle is increased to some extent, this is owing to an adsorption of the water in the air to the brick of the noodle at the time of suction, it would not causes any adversely affect on a quality of the noodle.

In order to examine in detail the relation between the leaving time after completing the frying of the brick of the noodles and an amounts of the removed oil, the present applicant had conducted the following experiment (Example 2).

EXAMPLE 2

Relation Between Leaving Time After Frying and Amounts of Removed Oil

After completing the frying according to the Example 1, selecting an appropriate condition on the leaving time after frying from 30 to 40 seconds and conducting the suction for 0.5 second with a same device of Example 1 at an air flow of 6.7 m³/min. The results of this experiment are shown in Table 3.

TABLE 3

Relation between Leaving Time of a Brick of Fried Noodles and Volume of Removed Oil

|  |  | Oil and Fat Content (%) | Water Content (%) |
|---|---|---|---|
|  | Control | 16.9 | 1.7 |
| Time for leaving | 30 (sec) | 12.6 | 2.0 |
| a brick of fried | 40 (sec) | 12.7 | 2.4 |
| noodles alone | 50 (sec) | 13.8 | 2.3 |
|  | 60 (sec) | 13.7 | 2.3 |

Apparently from Table 3, as the leaving time after frying is longer, an amounts of the removed oil tends to decrease and the brick of the noodle tends also to crack. Therefore, from these results, it had been found that a preferrable condition, being variable according to the size of the brick of the noodle, For removing the oil and the fat is not exceed 30 seconds, at longest 40 seconds, after completing the frying. However, under the condition of not cooling the fried noodle, the appropriate time for removing the oil of the fried noodle can be extended.

EXAMPLE 3

Figure 5A:
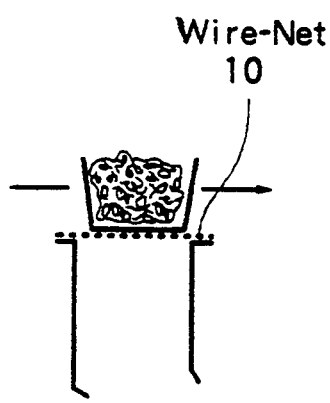
FIGS. 5(a), (b) and (c) are a schematic view showing a method for sucking and removing the oil according to a comparative example.

Experiment on Effects of Oil and Fat Suction 30 seconds after the completion of the frying according to the Example 1, as shown in FIG. 5(a), conducting the suction for 1 or 2 second(s) by sliding the fry retainer having no upper lid above the wire-net (indicated at 10) of 5 m/m mesh with "Fuji Ring Blow TM" manufactured by Fuji Electric Co., Ltd. at an air flow of 6.7 m³/min.

Figure 5B:
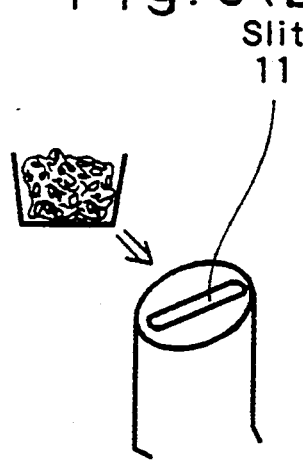

Further, 30 seconds after the completion of the frying, as shown in FIG. 5(b), conducting the suction for 1 or 2 second(s) from the bottom of the fry retainer having no upper lid by the oil removing head having the slit (indicated at 11) of 15 mm width and 70 mm length with "Fuji Ring Blow TM" manufactured by Fuji Electric Co., Ltd. at an air flow of 6.7 m³/min. The results of these experiments are shown in Table 4.

TABLE 4

Effects on Oil and Fat Suction

|  | Oil and Fat Content (%) | Water Content (%) |
|---|---|---|
| Control | 16.9 | 1.7 |
| Method (a):Suction for 1 sec. | 16.0 | 1.9 |
| Method (a):Suction for 2 sec. | 16.1 | 1.9 |
| Method (b):Suction for 1 sec. | 15.6 | 1.7 |
| Method (b):Suction for 2 sec. | 15.7 | 1.7 |

Apparently from Table 4, under the condition of the air flow of 6.7 m³/min, there is no difference between the method (a) and (b) on the effect of removing the oil and the fat, and it is proved that the method, as shown in the Examples 1 and 2, for removing the oil in the state of connecting (contacting) the oil removing head to the bottom of the fry retainer is effective.

EXAMPLE 4

Experiment on Effects of Oil and Fat Suction

Figure 5C:
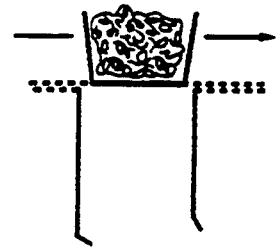

30~40 seconds after the completion of the frying according to the Example 1, as shown in FIG. 5(c), conducting the suction (for removing the oil and the fat) by making a space between the top surface of the oil removing head and the bottom of the fry retainer at an air flow of 16.6 m³/min. The results of this experiments are shown in Table 5.

TABLE 5

Effects on Oil and Fat Suction

|  | Oil and Fat Content (%) | Water Content (%) |
|---|---|---|
| Control | 17.9 | 1.7 |
| Suction for 1 sec:Space (2 mm) | 14.0 | 2.3 |
| Suction for 2 sec:Space (2 mm) | 13.3 | 2.6 |
| Suction for 2 sec:Space (4 mm) | 14.7 | 2.4 |
| Suction for 3 sec:Space (4 mm) | 14.2 | 2.5 |
| Suction for 4 sec:Space (4 mm) | 14.1 | 2.4 |

Further, 30~40 seconds after the completion of the frying, as shown in FIG. 5(b), conducting the suction (for removing the oil and the fat) from the bottom of the fry retainer having no upper lid by passing the fry retainer for 2.4 seconds above the oil removing head having the slit (indicated at 11) of 20 mm width and 75 mm length at an air flow of 28 m$^3$/min. The results of this experiments are shown in Table 6.

TABLE 6

| | Effects on Oil and Fat Suction | |
|---|---|---|
| | Oil and Fat Content (%) | Water Content (%) |
| Control | 18.7 | 1.8 |
| Space (2 mm) | 14.2 | 2.5 |
| Space (4 mm) | 14.6 | 2.3 |

Apparently from Table 5 and 6, by increasing the air flow and the time for suction, an effect on the suction to be used practically would also be obtained in case of making the space between the oil removing head and the fry retainer.

Considering the disclosures above, it is found that, in addition to the method of connecting the oil removing head to the bottom of said fry retainer, the method of bringing the oil removing head close to the fry retainer would also obtain the effects on the suction to be able to apply to the manufacturing process.

Industrial Applicability

According to the present invention, the oil and fat contained in the brick of the noodles can forcibly be removed by suction in a short time after frying. Therefore, prior to the penetration of the oil adhered to the surface of the noodle into the noodle, the oil can effectively be removed. Further, there is no crack by the suction force for sucking the oil because the brick of the noodle just fried have a high temperature and have an elasticity, thereby a product having a reduced oil content and an excellent quality and shape can be obtained.

Accordingly, it can be coped with the problems to be solved by reducing the remainded amounts of the oil raised by the consumer's attention against the European and American type adult-diseases caused by the increase of the intake of the oil and the fat as the eating-habits are Europeanized, and can be eliminated the problems of the oxidization of the oil and the fat at the stage of the conveyance and the preservation and of the deterioration of the fried noodles due to the oxidization.

Further, in comparison with the conventional centrifugation method and the gravity method, the present invention can easily be incorporated into a continuous fried noodle producing line, can also be applied to the continuous operation, can remove the oil and the fat easily and effectively, and can remarkably reduce the oil remainded without cracking the brick of the noodles.

We claim:

1. Apparatus for producing bricks of fried noodles, comprising:
   a) conveyor means for carrying and moving a plurality of fry retainers, each of said fry retainers holding a brick of noodles;
   b) a pan of cooking oil, said conveyor means moving said fry retainers into and out of said cooking oil and each of said bricks retaining a portion of said cooking oil;
   c) each of said fry retainers having a portion which is permeable to air and cooking oil; and
   d) oil removing means closely adjacent said fry retainer for sucking and removing a portion of said cooking oil retained by said bricks, said oil removing means comprising a head connectable to said portion of said fry retainers.

2. Apparatus for producing bricks of fried noodles, comprising:
   a) conveyor means for carrying and moving a plurality of fry retainers, each of said fry retainers holding a brick of noodles;
   b) a pan of cooking oil, said conveyor means moving said fry retainers into and out of said cooking oil and each of said bricks retaining a portion of said cooking oil;
   c) each of said fry retainers having a portion which is permeable to air and cooking oil; and
   d) oil removing means closely adjacent said fry retainer for sucking and removing a portion of said cooking oil retained by said bricks, said oil removing means comprising a head movable to approach said portion of said fry retainers.

3. Apparatus as set forth in either of claims 1 or 2, and further comprising means for closing the fry retainer packed each brick thereinto during frying said brick therein.

4. Apparatus as set forth in either of claims 1 or 2, wherein said portion of each of said fry retainers comprises a bottom wall having holes formed therein and is substantially covered by said bricks.

5. Apparatus as set forth in either of claims 1 or 2, wherein said oil removing means further comprises a separator connected to said head, and a suction device and an exhauster connected to said separator.

* * * * *

UNITED STATES PATENT AND TRADEMARK OFFICE
CERTIFICATE OF CORRECTION

PATENT NO. : 5,419,240

DATED : May 30, 1995

INVENTOR(S) : Morishita et al.

It is certified that errors appear in the above-identified patent and that said Letters Patent is hereby corrected as shown below:

Column 2, line 35, "are a schematic view" should be --are schematic views--.

Column 2, line 56, "in the a previous" should be --in a previous--.

Column 3, lines 10-11, "simulataneously" should be --simultaneously--.

Column 4, line 5, "would seems" should be --would seem--.

Column 4, line 25, "beating up" should be --heating up--.

Column 4, line 29, "As a results" should be --As a result--.

Column 5, line 2, "Time/Sucing Time" should be --Time/Sucking Time--.

Column 5, line 21, "leaved for" should be --left for--.

Column 5, line 38, "causes any adversely" should be --cause any adverse--.

Column 6, line 1, "preferrable condition" should be --preferable condition--.

Column 6, line 2, "noodle, For" should be --noodle, for--.

Column 6, line 3, "is not exceed" should be --should not exceed--.

Column 7, line 38, "the remainded" should be --the remaining--.

UNITED STATES PATENT AND TRADEMARK OFFICE
CERTIFICATE OF CORRECTION

PATENT NO. : 5,419,240
DATED : May 30, 1995
INVENTOR(S) : Morishita, et. al.

It is certified that error appears in the above-indentified patent and that said Letters Patent is hereby corrected as shown below:

Column 8, line 2, "oil remained" should be --oil remaining--.

Signed and Sealed this

Thirtieth Day of January, 1996

Attest:

BRUCE LEHMAN

Attesting Officer

Commissioner of Patents and Trademarks